United States Patent [19]

Mori et al.

[11] Patent Number: 5,080,448
[45] Date of Patent: Jan. 14, 1992

[54] ANTISKID BRAKE CONTROL SYSTEM

[75] Inventors: Akihiko Mori; Yasuo Naito, both of Himeji, Japan

[73] Assignee: Mitsubishi Denki K.K., Tokyo, Japan

[21] Appl. No.: 518,590

[22] Filed: May 2, 1990

[30] Foreign Application Priority Data

May 24, 1989 [JP] Japan .................................. 1-131814

[51] Int. Cl.$^5$ .............................................. B60T 8/70
[52] U.S. Cl. .................................. 303/107; 303/100; 303/108
[58] Field of Search ............... 303/100, 103, 105, 108, 303/110, 113, 107, 91

[56] References Cited

U.S. PATENT DOCUMENTS

| | | | |
|---|---|---|---|
| 3,706,479 | 12/1972 | Klein | 303/119 |
| 4,054,328 | 10/1977 | Leiber et al. | 303/103 |
| 4,143,842 | 3/1979 | Ubel | 303/93 |
| 4,773,714 | 9/1988 | Shimanuki et al. | 303/108 |
| 4,842,343 | 6/1989 | Akiyoshi et al. | 303/108 |
| 4,859,002 | 8/1989 | Yoshino | 303/108 |
| 4,924,394 | 5/1990 | Uchida et al. | 303/108 |
| 4,962,455 | 10/1990 | Ishikawa et al. | 303/108 X |

FOREIGN PATENT DOCUMENTS 61-28541  7/1986  Japan .
0232061  9/1988  Japan .................................. 303/108

Primary Examiner—Matthew C. Graham
Attorney, Agent, or Firm—Sughrue, Mion, Zinn Macpeak & Seas

[57] ABSTRACT

An antiskid brake control system which detects and calculates the wheel speed and deceleration, vehicle speed and deceleration, and slip ratio and accordingly decreases the braking force of at least one wheel to prevent wheel locking. Also monitored is the duration in which the braking force is decreased so that the braking force can subsequently be rapidly increased to the vicinity of the optimum braking force.

2 Claims, 5 Drawing Sheets

FIGURE 4(a)
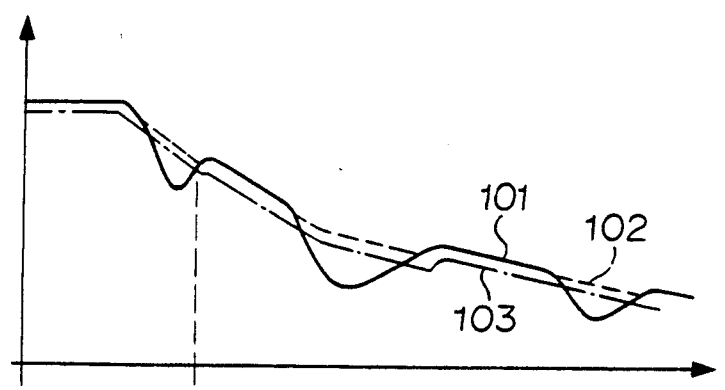
FIGURE 4(b)
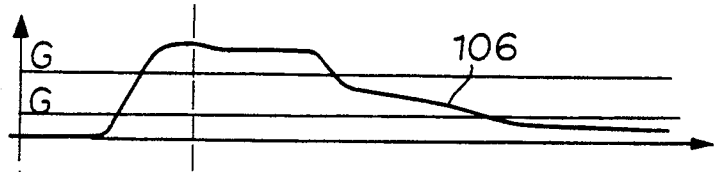
FIGURE 4(c)
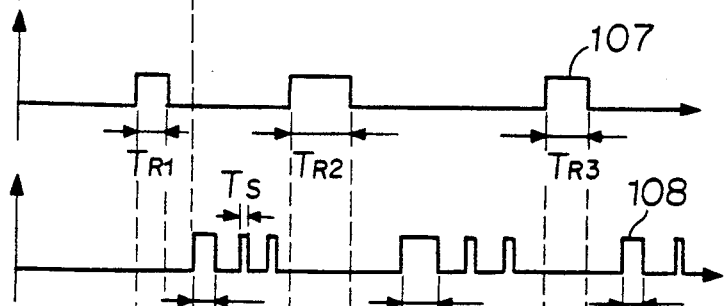
FIGURE 4(d)
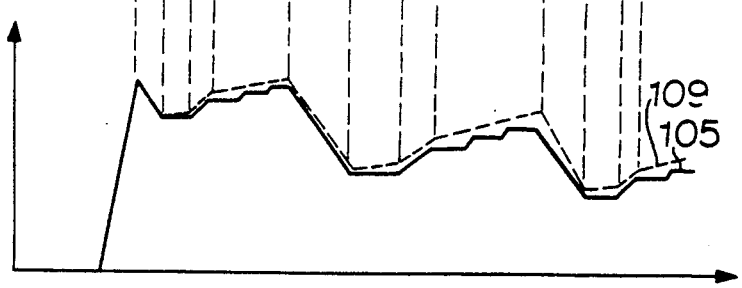
FIGURE 4(e)

ANTISKID BRAKE CONTROL SYSTEM

BACKGROUND OF THE INVENTION

1. Field of the Invention

The present invention relates to an antiskid brake control system wherein when there is a tendency of a vehicle wheel to lock at the time of braking the vehicle, the action of an actuator causes a brake pressure to decrease, wherein when the revolution of the wheel has been restored due to such pressure reduction, the brake pressure is revived, and wherein these operations are repeated to prevent the wheel from coming into its lock state.

2. Discussion of Background

FIG. 5 is a drawing to help explain the operation of a conventional antiskid system for a vehicle as disclosed in e.g. Japanese Examined Patent Publication No. 28541/1986. In FIG. 5, reference numeral 101 designates the speed of a wheel. Reference numeral 102 designates the actual speed of a vehicle with the wheel. Reference numeral 103 designates the speed of the vehicle including a slip ratio of x%. Reference numeral 104 designates deceleration in the wheel speed 101. Reference numeral 105 designates a brake pressure.

In the time period between $t_2$-$t_3$, the brake pressure is decreased because the wheel deceleration 104 exceeds a given value $\alpha_1$, i.e., there is a tendency of the vehicle wheel to lock. After that, in the time period between $t_5$-$t_6$, the brake pressure is gradually increased since the wheel acceleration/deceleration is greater than a given value $\alpha_3$, which means that the wheel have been free from the tendency to be locked. The conventional antiskid brake control system carries out such control that the braking force is gradually increased after the braking force has been decreased. This creates problems wherein variation in the brake pressure with respect to the optimum braking force is great, and a control time wherein the braking force is controlled in the vicinity of the optimum value is too short to shorten stopping distance by braking.

SUMMARY OF THE INVENTION

It is an object of the present invention to dissolve these problems, and to provide a new and improved antiskid brake control system capable of obtaining an adequate amount of increase in a brake pressure after having decreased a braking force, and of rapidly reviving the braking force to the vicinity of the optimum braking force, allowing the stopping distance by braking to be shortened.

The foregoing and other objects of the present invention have been attained by providing an antiskid brake control system comprising wheel speed detecting means for detecting the speed of at least one wheel; braking force adjusting means for decreasing and increasing a braking force to be applied to the wheel; wheel deceleration detecting means for detecting acceleration/deceleration of the wheel; vehicle speed calculation means for calculating vehicle speed based on the wheel speed information obtained by the wheel speed detecting means; slip ratio calculation means for calculating slip ratio based on the vehicle speed and the wheel speed; vehicle deceleration detecting means for detecting deceleration of the vehicle; decreasing amount calculation means for receiving the wheel deceleration information obtained by the wheel deceleration detecting means and the slip ratio information, and for outputting a signal indicative of a decrease in the pressure for the braking force to the braking force adjusting means when detecting a tendency of the wheel to lock wherein the wheel deceleration or the slip ratio exceeds a given value; pressure-decreasing period measurement means for measuring the period where the pressure-decreasing signal is being outputted; and increasing amount calculation means for receiving the slip ratio information, the vehicle deceleration information obtained by the vehicle deceleration detecting means, and the pressure-decreasing period information measured by the pressure-decreasing period measurement means, and for when the slip ratio has lowered to the given value or less, finding an increasing amount required to increase the braking force, based on the pressure-decreasing period and on the vehicle deceleration, and outputting a signal indicative of the required increasing amount to the braking force adjusting means.

In accordance with the present invention, the increasing amount which is required after having decreased the brake pressure is determined by the increasing amount calculation means based on the vehicle deceleration and the pressure-decreasing period. This allows the braking force to be rapidly increased. As a result, the braking force can reach the vicinity of the optimum braking force more quickly, consequently offering an advantage in that the stopping distance by braking can be shortened.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 4(a), 4(b), 4(c), 4(d) and 4(e) are graphs showing an operation according to the present invention.

DETAILED DESCRIPTION OF THE PREFERRED EMBODIMENTS

Now, the present invention will be described in detail with reference to a preferred embodiment illustrated in the accompanying drawings.

Figure 1:
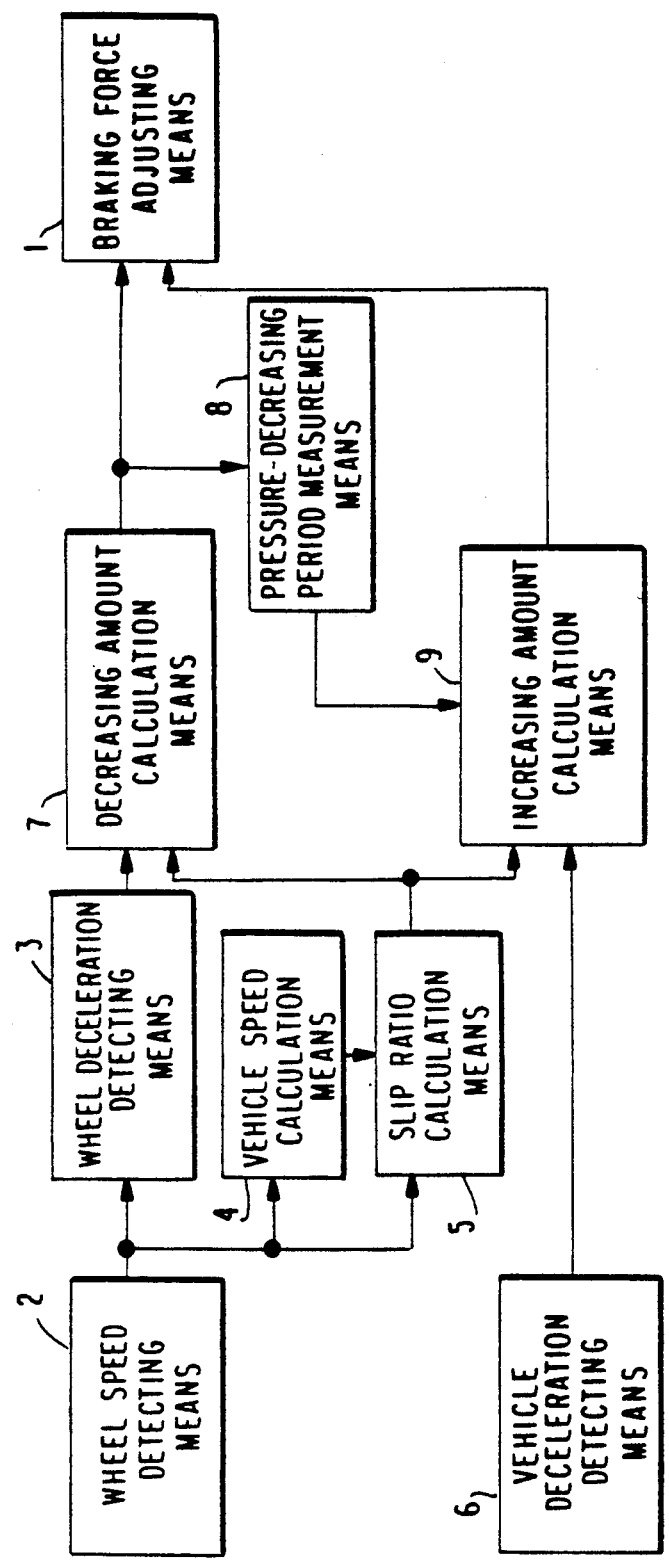
FIG. 1 is a block diagram showing an embodiment of the antiskid brake control system according to the present invention.

FIG. 1 is a block diagram showing a schematic structure of the embodiment.

In accordance with the embodiment shown in FIG. 1, the antiskid brake control system according to the present invention comprises braking force adjusting means 1, wheel speed detecting means 2, wheel deceleration detecting means 3, vehicle speed calculation means 4, slip ratio calculation means 5, vehicle deceleration detecting means 6, reducing amount calculation means 7, pressure-decreasing period measurement means 8, and increasing amount calculation means 9.

The braking force adjusting means 1 receives a signal indicative of a decrease in pressure from the decreasing amount calculation means 7, and a signal indicative of an increase in pressure from the increasing amount calculation means 9, and is to decrease and increase a braking force to be applied to a wheel of a vehicle.

The wheel speed detecting means 2 detects the speed of the wheel to which the braking force is applied. The wheel deceleration detecting means 3 is to detect the deceleration of the wheel based on the information on the wheel speed. The vehicle speed calculation means 4 is to calculate the speed of the vehicle based on the information on the wheel speed. The slip ratio calculation means 5 is to calculate slip ratio based on the information on the vehicle speed and on the information on the wheel speed.

The vehicle deceleration detecting means 6 is to detect the deceleration of the vehicle to output information on the vehicle deceleration to the increasing amount calculation means 9.

The decreasing amount calculation means 7 is to receive the wheel deceleration information detected by the wheel deceleration detecting means 3 and the slip ratio information calculated by the slip ratio calculation means 5, and outputs a signal indicative of a decrease in the braking force to the braking force adjusting means 1 and the pressure-decreasing period measurement means 8 when wheel deceleration or slip ratio having a given value or above is detected.

The pressure-decreasing period measurement means 8 is to measure the period wherein the pressure-decreasing signal is being outputted from the decreasing amount calculation means 7, and outputs information on the pressure-decreasing period to the increasing amount calculation means 9.

The increasing amount calculation means 9 receives the slip ratio information, the vehicle deceleration information and the pressure-decreasing period information. When the slip ratio has achieved a given value or less, the increasing amount calculation means 9 calculates a control amount based on the relationship between the pressure-decreasing period information and the vehicle deceleration information, and outputs a signal indicative of an increase in the braking force to the braking force adjusting means 1.

Next, the embodiment will be explained more specifically with reference to FIG. 2.

Figure 2A:
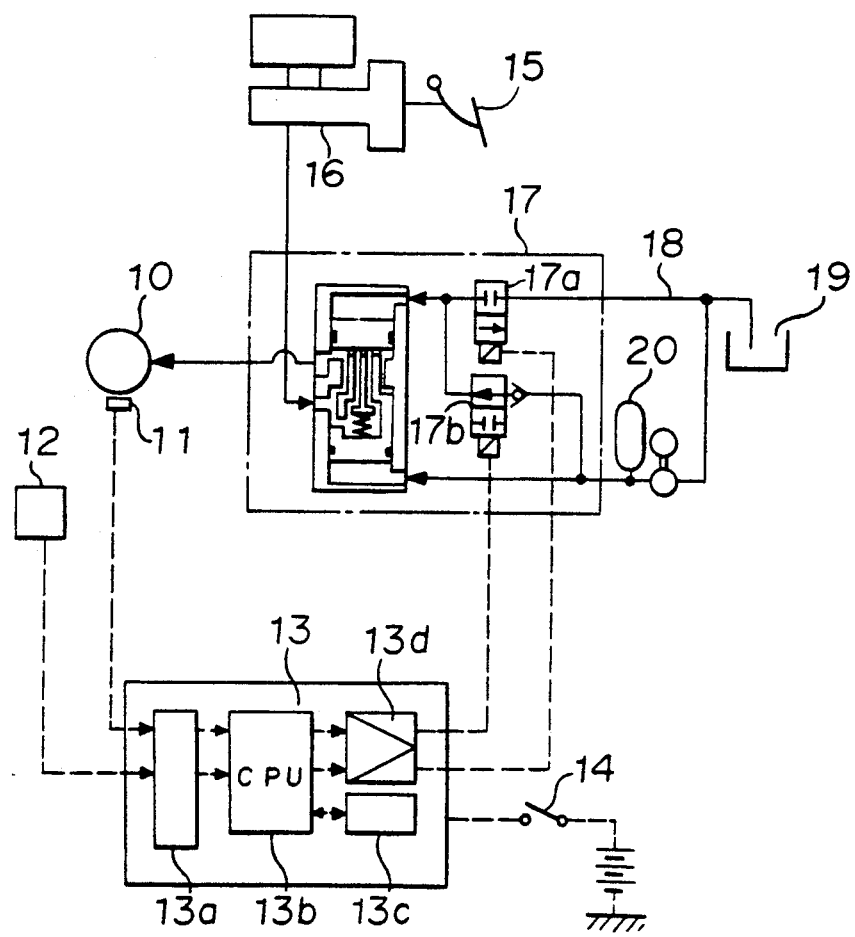
FIG. 2(a) is a block diagram showing a specific structure of the embodiment.

FIG. 2(a) is a block diagram showing a schematic structure of the specific embodiment. Explanation on only one wheel will be made for the sake of simplicity.

In FIG. 2(a), reference numeral 10 designates a wheel brake. Reference numeral 11 designates a wheel speed sensor which is arranged to detect the wheel speed. Reference numeral 12 designates a G sensor (acceleration sensor) which detects acceleration-deceleration of the vehicle, and which can be constituted by a differential transformer and the like.

Reference numeral 13 designates a control circuit which is provided with power through a power source switch 14 for supplying the power, which receives at its input circuit 13a signals from the wheel speed sensor 11 and the G sensor 12, and whose central processing unit using a microcomputer 13b operates in accordance with an instruction program stored in a memory 13c and outputs the results of the operation to its outputs circuit 13d.

The braking force is transmitted to the wheel brake 10 through a master cylinder 16 and through a braking force adjusting actuator 17 when a driver presses a brake pedal 15 under normal conditions.

Figure 2B:
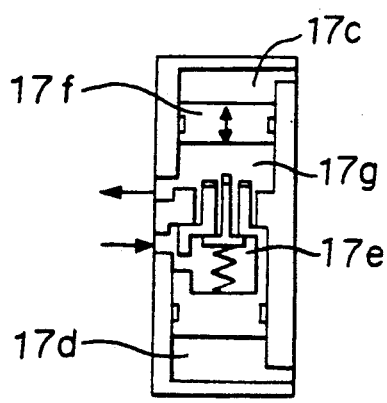
FIG. 2(b) is an enlarged sectional view of the braking force adjusting force actuator shown in FIG. 2(a)

The operation which is made under antiskid conditions will be described in detail with reference to FIG. 2(b) which is an enlarged view of the braking force adjusting actuator 17.

The pressure in a chamber 17c and the pressure in a chamber 17d of the actuator 17 are kept at the same level under normal conditions, and a cutvalve 17e of the actuator is therefore pushed by a piston 17f of the actuator to be opened.

When a signal indicative of a decrease in the braking force is outputted from the control circuit 13, a solenoid valve 17a for pressure-decreasing operation and a solenoid valve 17b for pressure-holding operation are both operated to release the pressure in the chamber 17c to a reservoir 19 through a conduit. As a result, the piston 17f is shifted upward in FIG. 2(b) to close the cutvalve 17e, causing the communication between the master pressure and the wheel pressure to be cut off, and the volume in the chamber 17g to expand. Thus, the braking force is decreased.

When the control circuit 13 outputs a signal indicative of holding the pressure, the solenoid valve 17a for pressure-decreasing operation is made inoperative while only the solenoid valve 17b for pressure-holding operation is operated. As a result, the movement of the piston 17f is stopped to hold the braking force.

When the control circuit 13 outputs a signal indicative of an increase in pressure, both the solenoid valve 17a and the solenoid valve 17b are made inoperative, causing a pressure to enter the chamber 17c by the combination of a pump motor and an accumulator 20 as a power source, the pump motor and the accumulator maintaining a high pressure. Thus, the piston 17f is shifted downward in FIG. 2(b) to decrease the volume in the chamber 17g, causing the braking force to be increased.

As explained, the system according to the present invention has such function that the operations of decreasing the pressure, holding the pressure and increasing the pressure are repeated in accordance with commands from the control circuit 13 to adjust the braking force, thereby preventing the wheel from being locked.

Figure 3:
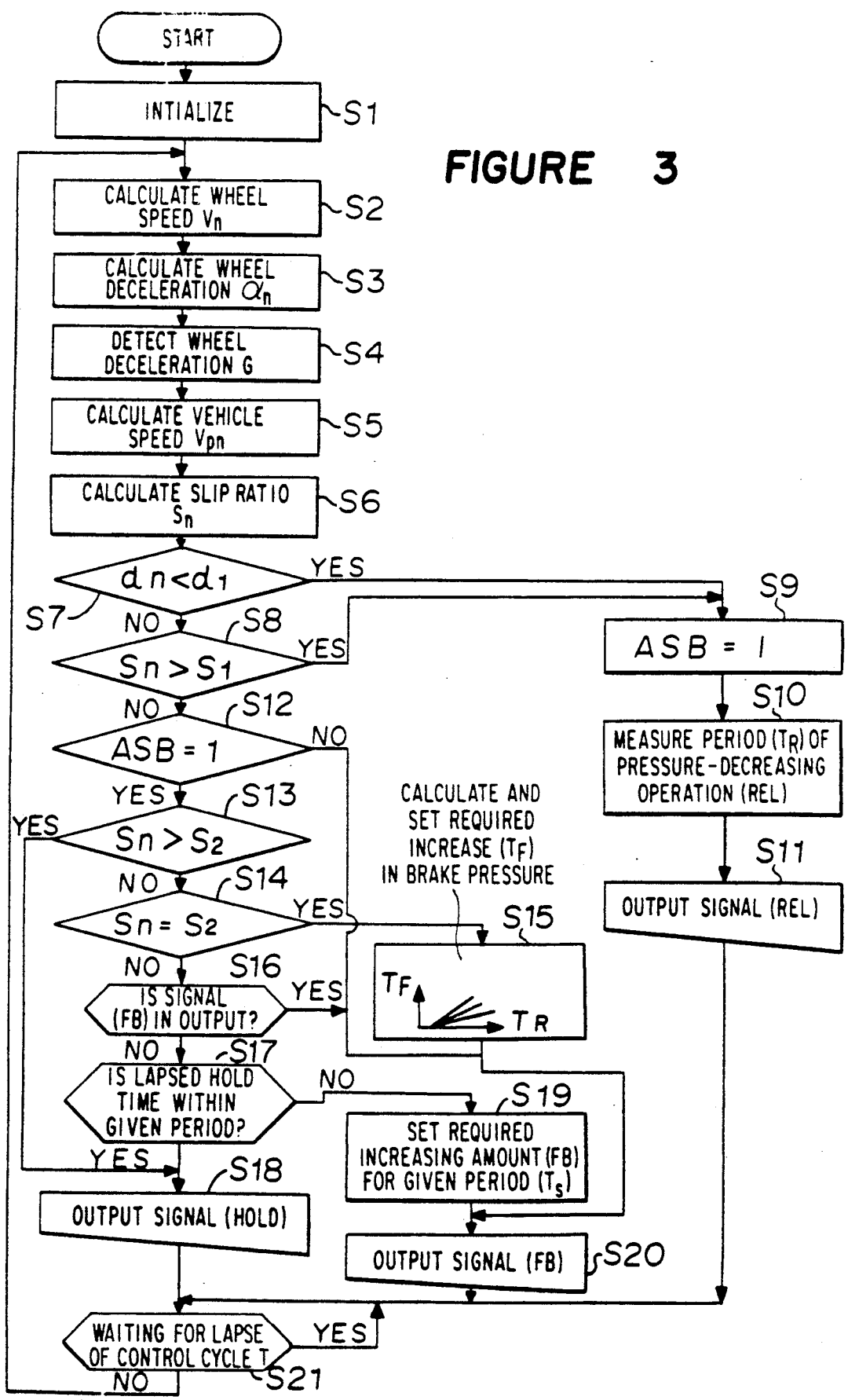
FIG. 3 is a flow chart showing the operation of a microcomputer incorporated in the control circuit shown in FIG. 2(a)
Figure 5:
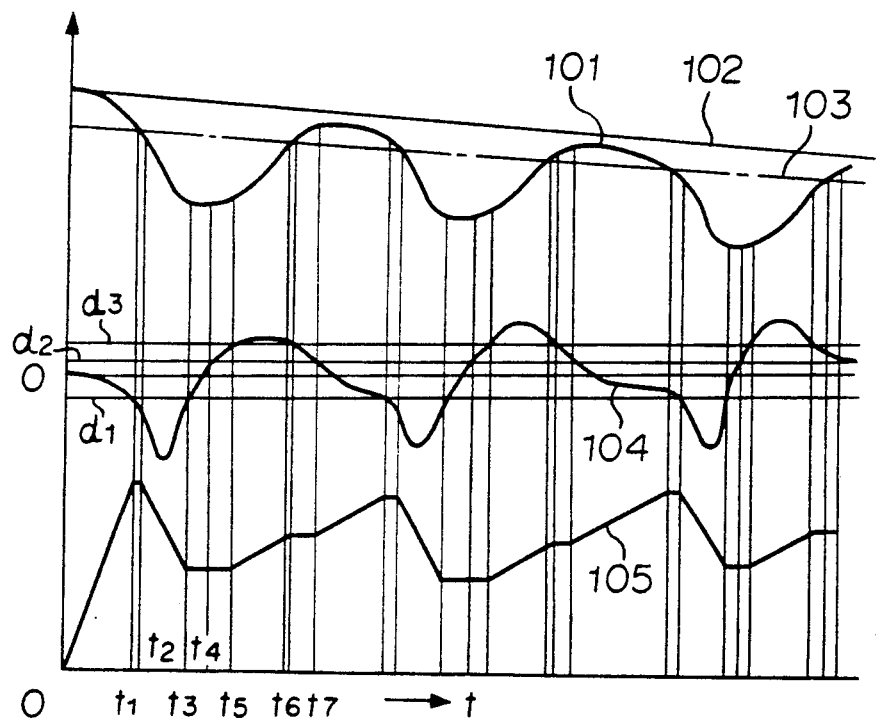
FIG. 5 is a drawing of graphs showing a conventional antiskid brake control system for a vehicle.

Next, the operation of the microcomputer 13b in the control circuit 13 will be explained with reference to the flow chart of FIG. 3.

When the operation of the microcomputer starts, RAMs and others are initialized at a step S1, and the wheel speed $V_n$ is calculated at a step S2. As the calculation manner to find the wheel speed $V_n$, e.g. a periodic measurement can be applied. In the periodic measurement, the wheel speed $V_n$ is found based on the number $P_n$ of the pulses corresponding to the wheel speed which have been inputted in a certain period, the time $t_1$ when the first pulse is inputted after the measurement started, and the time $t_n$ when the final pulse is inputted, in accordance with the following expression wherein K is a constant:

$$V_n = K \frac{P_n - 1}{t_n - t_1} \tag{1}$$

Next, the wheel deceleration $\alpha_n$ is calculated at a step S3. In the calculation of the wheel deceleration, the wheel deceleration can be found based on the control cycle T of the microcomputer 13b, the wheel speed $V_{n-1}$ in the preceding control cycle, and the wheel speed $V_n$ in the present control cycle, in accordance with the following expression:

$$a_n = L \frac{(V_n - V_{n-1})}{T} \quad (2)$$

In the expression, the inequality, $a_n < 0$, means deceleration, the inequality, $a_n > 0$, means acceleration, and L is a constant.

At the next step S4, the vehicle deceleration G is inputted from the G sensor 12.

At the next step S5, the vehicle speed $V_{pn}$ is calculated. In the calculation manner, the value which is obtained by descending the vehicle speed $V_{pn-1}$ in the preceding control cycle at a predetermined rate, and the value of the wheel speed $V_n$ in the present control cycle are compared, and a greater value is chosen to find the vehicle speed.

The predetermined rate can be modified depending on the vehicle deceleration or the output conditions of the control signals.

At the next step S6, the slip ratio $S_n$ is calculated. For this calculation, the following expression can be utilized:

$$S_n = \frac{V_{pn} - V_n}{V_{pn}} \quad (3)$$

At the next step S7, it is checked whether the wheel deceleration $a_n$ found at the step S3 is smaller than a give value $a_1$. If $a_n \geq a_1$, it is checked at the next step S8 whether the slip ratio $S_n$ calculated at the step S6 is greater than a given value $S_1$.

If $a_n < a_1$ at the step S7, or $S_n > S_1$ at the step S8, a flag ASB which indicates that it should be under antiskid brake control is set at a step S9.

The flag ASB is reset at the completion of the antiskid brake control, i.e., when the vehicle speed has lowered to a predetermined value or less, or depending on the number of the pressure increasing operations (not shown).

At a step S10, the period $T_R$ where pressure-decreasing operation (REL) is carried out is measured.

At the next step S11, a signal (REL) indicative of a decrease the pressure for the braking force is outputted.

On the other hand, if $S_n \leq S$, at the step S8, it is checked at a step S12, whether it is under the antiskid brake control or not. If affirmative, it is checked at a step S13 whether the slip ratio $S_n$ is greater than a given Value $S_2$ ($S_2 < S_1$) or not.

At the next step S14, it is checked whether the slip ratio $S_n$ is equal to $S_2$ or not. If affirmative, a required increasing amount in the pressure is calculated at a step S15. The calculation manner will be explained later on.

On the other hand, if the slip ratio $S_n$ satisfies the inequation $S_n < S_2$, it is checked at a step S16 whether a signal (FB) indicative of an increase in the pressure for the braking force is outputted or not. If negative, it is checked at a step S17 whether the hold time wherein the braking force is held constant is counted or not.

Unless the hold time $T_H$ has continued for a given period, a signal (HOLD) indicative of holding the braking force is outputted at a step S18.

On the other hand, if the hold time has continued for the given period, a required increasing amount $T_S$ in the pressure of the braking force only for a given time is set at a step S19, and a signal (FB) indicative of such increasing amount is outputted at a step S20.

At a step S21, the lapse of the control cycle T of the microcomputer 13b is awaited. When the control cycle T has passed, the process returns to step S2, and then the steps subsequent to the step S2 will be repeated.

At the step S15, the required increasing amount $T_F$ can be found by the following expressions based on the pressure-decreasing signal outputting period $T_R$ measured at the step S10:

$$T_F = 0 \; (T_R < T_{R1}) \quad (4)$$

$$T_F = MT_R \; (T_R \geq T_{R1}) \quad (5)$$

In the expressions, $T_{R1}$ is a constant, and M is a constant dependent on the vehicle deceleration G as follows:
If $G < G_1$, then $M = M_1$
If $G_1 \leq G < G_2$, then $M = M_2$
If $G_2 \leq G$, then $M = M_3$
wherein there is a relation of $M_1 < M_2 < M_3$.

It means that the pressure-increasing amount $T_F$ is dependent on the pressure-decreasing period $T_R$ and the vehicle deceleration G, and that the longer the pressure-decreasing period, the greater the pressure-increasing amount is, and the greater the vehicle deceleration, the greater the pressure-increasing amount is.

The increasing amount $T_S$ can be e.g. a predetermined value.

The case wherein the operations stated above are carried out at a vehicle will be explained with reference to FIG. 4. Suppose that the wheel speed has changed as indicated by 101 in FIG. 4(a). The vehicle speed is calculated as indicated by the dotted line of 102 in FIG. 4(a), and the vehicle speed with slip ratio of x% is calculated as indicated by 103 in FIG. 4(a).

In addition, suppose that the vehicle deceleration information has changed as indicated by 106 in FIG. 4(b). The pressure-decreasing signal is outputted based on the wheel deceleration as indicated in FIG. 4(c) and a pressure-decreasing signal outputting period $T_R$ is measured.

At the time when a vehicle speed 103 with slip ratio of x% agrees with a wheel speed 101, a required increasing amount $T_F$ which is calculated based on the vehicle deceleration information 106 and the pressure-decreasing signal outputting period $T_R$ is outputted in the form of signals 108 as shown in FIG. 4(d).

After the signal indicative of the increasing amount $T_F$ was outputted, signals indicative of a pressure-increasing amount $T_S$ are outputted each given time. In this way, after the braking pressure lowered, the braking pressure is rapidly increased after a time, and then the braking pressure is gradually increased.

Although the embodiment as stated earlier detects the vehicle deceleration in a linear manner, a switching type detection using a G switch such as a mercury switch can be utilized.

In addition, although the embodiment as stated earlier adopts a type wherein the gradual increase in the braking pressure after the rapid increase in the braking pressure is made in two modes of hold and increase, the type wherein the braking pressure is gradually increasing at a certain gain as indicated by 109 in FIG. 4(e) can be adopted.

Obviously, numerous modifications and variations of the present invention are possible in light of the above teachings. It is therefore to be understood that within the scope of the appended claims, the invention may be practiced otherwise than as specifically described herein.

What is claimed is:

1. An antiskid brake control system comprising:
   wheel speed detecting means for detecting the speed of at least one wheel and outputting a wheel speed signal indicative of said wheel speed;
   braking force adjusting means for decreasing and increasing a braking force to be applied to the wheel;
   wheel deceleration detecting means responsive to said wheel speed signal for detecting an acceleration/deceleration of the wheel and outputting a wheel deceleration signal indicative of said acceleration/deceleration of the wheel;
   vehicle speed calculation means for calculating a vehicle speed based on said wheel speed signal and outputting a vehicle speed signal indicative of said vehicle speed;
   slip ratio calculation means for calculating a slip ratio of the wheel based on said vehicle speed signal and said wheel speed signal and outputting a slip ratio signal indicative of said slip ratio of the wheel;
   vehicle deceleration detecting means for detecting a deceleration of the vehicle and outputting a vehicle deceleration signal indicative of said deceleration of the vehicle;
   decreasing amount calculation means responsive to said wheel deceleration signal and said slip ratio signal for outputting to said braking force adjusting means a signal indicative of a change in an amount of pressure of the braking force when detecting a tendency of the wheel to lock indicated by said wheel deceleration signal or said slip ratio signal exceeding a predetermined value;
   pressure-decreasing period measurement means for outputting a pressure-decreasing signal indicative of a period representative of the duration in which said decreasing amount calculation means outputs said signal indicating a decrease in said amount of pressure of the braking force; and
   increasing amount calculation means responsive to said slip ratio signal, said vehicle deceleration signal, and said pressure-decreasing signal, for calculating a pressure-increasing signal when said slip ratio signal is within a predetermined range in accordance with a predetermined relationship between said pressure-decreasing signal and said vehicle deceleration signal, and outputting said pressure-increasing signal indicative of an amount required to increase the braking force adjusting means in accordance with said calculation thereby rapidly increasing said braking force to an optimum braking force.

2. The antiskid brake control system as claimed in claim 1, further comprising: a computer means having a memory means for calculating said wheel speed and deceleration, said vehicle speed and deceleration, and said slip ratio for computing an amount to increase, hold, and decrease said braking force; an input receiving means for receiving said wheel speed signal and said vehicle deceleration signal to said computer means; and an output means for outputting a hold signal, said pressure decreasing signal and said pressure increasing signal to said braking force adjusting means.

* * * * *